(12) United States Patent
Ionov et al.

(10) Patent No.: US 8,938,362 B2
(45) Date of Patent: Jan. 20, 2015

(54) SYSTEMS, METHODS, AND APPARATUS FOR DOPPLER LIDAR

(75) Inventors: Pavel Igorevich Ionov, Los Angeles, CA (US); Steven M. Beck, Palos Verdes Estates, CA (US)

(73) Assignee: The Aerospace Corporation, El Segundo, CA (US)

( * ) Notice: Subject to any disclaimer, the term of this patent is extended or adjusted under 35 U.S.C. 154(b) by 466 days.

(21) Appl. No.: 13/355,987

(22) Filed: Jan. 23, 2012

(65) Prior Publication Data
US 2013/0191027 A1  Jul. 25, 2013

(51) Int. Cl.
G01W 1/00 (2006.01)
G06F 19/00 (2011.01)
G01P 5/26 (2006.01)
G01S 17/95 (2006.01)
G01S 17/58 (2006.01)
G01S 17/88 (2006.01)

(52) U.S. Cl.
CPC . *G01P 5/26* (2013.01); *G01S 17/95* (2013.01); *G01S 17/58* (2013.01); *G01S 17/88* (2013.01)
USPC ............... 702/3; 356/450; 356/519; 702/142

(58) Field of Classification Search
CPC .......... G01P 5/26; G01S 17/58; G01S 17/95; G01S 7/497; G01J 9/04
USPC ............. 702/3, 4, 96, 98, 99, 124, 142, 159; 356/450, 519; 382/100
See application file for complete search history.

(56) References Cited

U.S. PATENT DOCUMENTS

2011/0164783 A1* 7/2011 Hays et al. ............... 382/100
2012/0050750 A1* 3/2012 Hays et al. ............... 356/519

OTHER PUBLICATIONS

Hayes, P., et al., "Space-based Doppler Winds LIDAR: A Vital National Need." May 2005. (15 pgs.).

\* cited by examiner

*Primary Examiner* — John H Le

(74) *Attorney, Agent, or Firm* — Sutherland, Asbill & Brennan LLP

(57) ABSTRACT

Certain embodiments of the invention may include systems, methods, and apparatus for Doppler light detection and ranging (LIDAR). According to an example embodiment of the invention, a method is provided for measuring atmospheric wind speed. The method includes tuning, in sequence, light output of a laser to a first wavelength and a second wavelength, wherein the first wavelength and the second wavelength are symmetric about a maximum transmission wavelength peak associated with a Fabry-Perot etalon; directing the light output to one or more portions of the atmosphere; receiving backscattered light from the one or more portions of the atmosphere; directing the received backscatter light through the Fabry-Perot etalon; detecting a transmission signal corresponding to light transmitted through the Fabry-Perot etalon; and determining, by at least the transmission signal, atmospheric wind speed at one or more portions of the atmosphere.

17 Claims, 3 Drawing Sheets

SYSTEMS, METHODS, AND APPARATUS FOR DOPPLER LIDAR

FIELD OF THE INVENTION

This invention generally relates to Doppler light detection and ranging (LIDAR).

BACKGROUND OF THE INVENTION

Light detection and ranging (LIDAR) operates in a manner similar to that of RADAR, but utilizes laser light instead of microwaves. In a LIDAR system, a laser beam may be directed to an object or a group of objects, which could include molecules or particles in the atmosphere. Light reflected or backscattered from the objects may be received and analyzed to determine distance, direction, and/or speed of the objects.

Some of the challenges involved with LIDAR include very weak reflected or backscattered signals that are available for detection. Other challenges stem from non-ideal behavior of optical components. For example, when multiple etalons are used for filtering a LIDAR system, relative spectral drifts and non-identical spectral transmission functions associated with multiple independent optical filters can limit the accuracy and/or the sensitivity of the measurement.

BRIEF SUMMARY OF THE INVENTION

Some or all of the above needs may be addressed by certain embodiments of the invention. Certain embodiments of the invention may include systems, methods, and apparatus for Doppler LIDAR.

According to an example embodiment of the invention, a method is provided for measuring atmospheric wind speed. The method includes tuning, in sequence, light output of a laser to a first wavelength and a second wavelength, wherein the first wavelength and the second wavelength are symmetric about a maximum transmission wavelength peak associated with a Fabry-Perot etalon; directing the light output to one or more portions of the atmosphere; receiving backscattered light from the one or more portions of the atmosphere; directing the received backscatter light through the Fabry-Perot etalon; detecting a transmission signal corresponding to light transmitted through the Fabry-Perot etalon; and determining, by at least the transmission signal, atmospheric wind speed at one or more portions of the atmosphere.

According to another example embodiment, a system is provided. The system includes an etalon; a tunable laser, operable for outputting in sequence, light at a first wavelength and a second wavelength, wherein the first wavelength and the second wavelength are symmetric about a maximum transmission wavelength peak associated with the etalon; a telescope module, operable for directing the laser light output to one or more portions of the atmosphere, and for receiving backscattered light from the one or more portions of atmosphere; at least a first detector for detecting a transmission signal corresponding to light transmitted through the Fabry-Perot etalon; and a controller comprising at least one processor configured for determining, by at least a detected transmission signal, atmospheric wind speed at one or more portions of the atmosphere.

According to an example embodiment of the invention, an apparatus is provided. The apparatus includes an etalon; a tunable laser, operable for outputting in sequence, light at a first wavelength and a second wavelength, wherein the first wavelength and the second wavelength are symmetric about a maximum transmission wavelength peak associated with the etalon; at least a first detector for detecting a transmission signal corresponding to light transmitted through the Fabry-Perot etalon; and a controller comprising at least one processor configured for determining, by at least a detected transmission signal, atmospheric wind speed at one or more portions of the atmosphere.

Other embodiments, features, and aspects of the invention are described in detail herein and are considered a part of the claimed invention. Other embodiments, features, and aspects can be understood with reference to the following detailed description, accompanying drawings, and claims.

BRIEF DESCRIPTION OF THE FIGURES

Reference will now be made to the accompanying figures, which are not necessarily drawn to scale, and wherein.

DETAILED DESCRIPTION OF THE INVENTION

Figure 1:
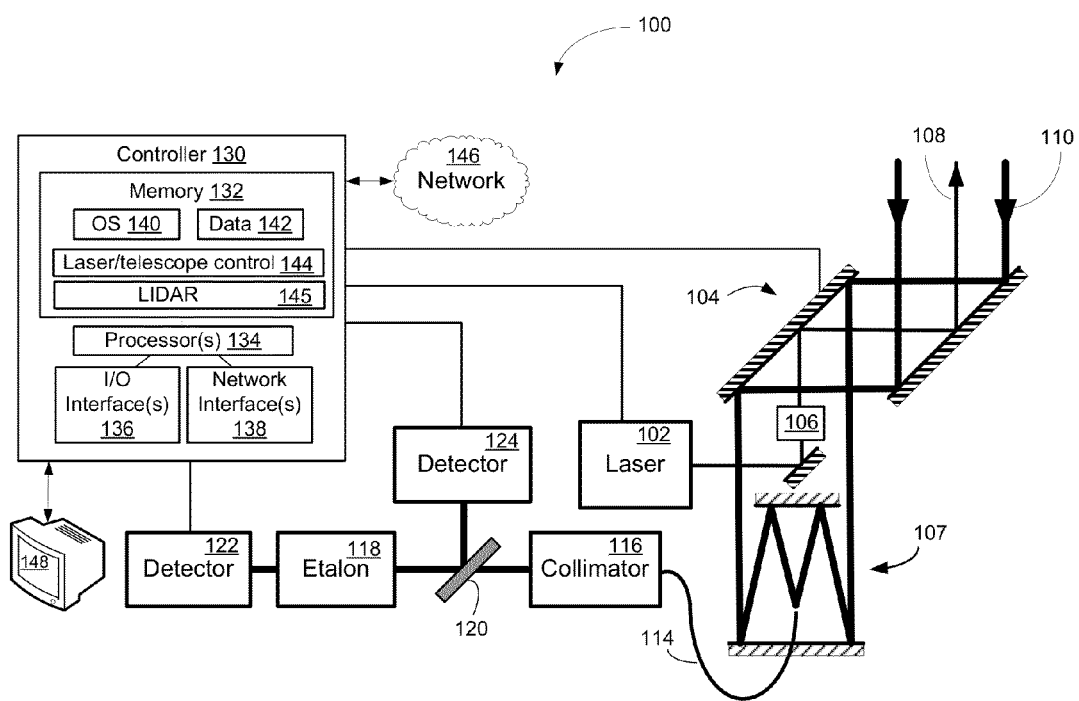
FIG. 1 is a block diagram of an illustrative LIDAR system, according to an example embodiment of the invention.

Embodiments of the invention will be described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Certain embodiments of the invention may enable remote detection of atmospheric wind speed. According to certain example embodiments, double-edge direct detection of spectral shifts with a single Fabry-Perot etalon may enable remote sensing of atmospheric wind speed and/or changes in pressure and/or temperature. According to example embodiments, the double-edge measurement includes probing a portion of the atmosphere with a laser transmitter detuned to one side of the etalon transmission peak, and then detuned symmetrically to the other side of the etalon transmission peak. In an example embodiment, two measurements are performed with the laser transmitter detuned symmetrically to either side of the etalon transmission peak.

In accordance with example embodiments, relative spectral offsets between the laser and the detection filter may be fixed during both measurements with a locking scheme whereby a small portion of the laser light is sent through the filter. In an example embodiment, both locking light and LIDAR detected light traverses the same etalon and optical path in the detection system.

According to an example embodiment, normalization may be utilized to reduce errors due to issues such as laser power fluctuation, alignment instabilities, or atmospheric turbulence. Normalization may include utilizing a relative transmission through the etalon, $T/(T+R)$, where T is the light intensity transmitted by the etalon filter, and R is the light intensity reflected by the etalon filter.

According to example embodiments, the probing laser light may be backscattered from molecules or particles in the atmosphere, and parameters associated with the backscattered signal may be detected. According to example embodiments, a detected time-domain signal may represent the round-trip time (or distance) that the probing light travelled. If molecules and particles (if present) comprising the atmosphere exhibit an average collective motion commonly known as wind, backscattered light exhibits a Doppler shift with respect to the transmitter wavelength. Measurement of this Doppler shift is the conventional method of measuring atmospheric wind with LIDAR.

According to example embodiments, the detected signals from the received light may be compared at both detuned wavelengths to determine the Doppler shift as a function of distance into the atmosphere. In accordance with example embodiments, the determined Doppler shift may be utilized to determine or estimate atmospheric wind speed.

Various optical and electronic components may be utilized in the single etalon LIDAR system, according to example embodiments of the invention, and will now be described with reference to the accompanying figures.

FIG. 1 is a schematic block diagram of an illustrative LIDAR system 100, according to an example embodiment. In an example embodiment, the LIDAR system 100 includes a laser 102. In an example embodiment, the laser 102 may be pulsed. For example, a Nd:YAG laser may be configured for pulsing by using a Q-switch, which can be utilized to produce light pulses with high peak optical power. According to an example embodiment, the laser 102 may produce light radiation having an approximate line width of 100 MHz, and pulses having approximately a 10 ns pulse width. In an example embodiment, the laser 102 may include a continuous wave "seeded laser" that may be utilized in generating the output and/or for tuning the output wavelength. According to an example embodiment, a laser 102 frequency may be tripled with non-linear crystals and may provide a pulsed output with a wavelength of approximately 355 nm, and a repetition rate of approximately 30 Hz. Other wavelengths may be utilized according to embodiments of the invention. Examples may include other harmonics of a Nd:YAG laser such as 532 nm or 266 nm. According to example embodiments, other lasers such as Yb:YAG, Nd:Glass, Yb:Eb:Glass, Alexandrite, Titanium sapphire, dye lasers, or fiber lasers may be utilized. The lasers may have any repetition rate from no repetition at all (for example, continuous wave) to repetition rates of 100 s of MHz. According to example embodiments, repetition rates may be in the range of about 1 Hz to about 100 kHz may be utilized.

In an example embodiment, the laser output 108 may be directed to a portion of the atmosphere with a telescope module 104. In an example embodiment, the telescope module 104 can include a beam expander 106. According to an example embodiment, the telescope module 104 can include mirrors for directing the light. In an example embodiment, the backscattered light 110 may be directed back through the beam steering mirrors to a telescope 107. According to an example embodiment, the telescope 107 may couple the backscattered light 110 into optional optical fiber 114.

According to an example embodiment, a series of lenses and/or mirrors may be utilized to collimate and adjust the beam width for use with the etalon 118. According to an example embodiment, the light exiting the optical fiber 114 may be expanded and collimated via a collimator 116 for use with the etalon 118. Optionally, the collimator 116 may include bandpass optical filters to suppress certain optical background radiation or light.

In an example embodiment, light may enter the etalon 118 after passing through a beam splitter 120. In an example embodiment, the etalon may have an approximate full width half max transmission bandwidth of approximately 1.5 GHz. According to an example embodiment, light transmitted through the etalon 118 may be detected with a first detector 122. In an example embodiment, the beam splitter 120 may be a 50/50 beam splitter. In another example embodiment, the beam splitter 120 may be a polarization beam splitter and a quarter waveplate. FIG. 1 shows the beam splitter 120 between the etalon 118 and the collimator 116. According to another example embodiment, the collimator 116 may be placed between the beam splitter 120 and the etalon 118.

According to one optional embodiment, the beam splitter 120 can be removed to provide a stronger signal for detection. For example, the beam splitter 120 may be present primarily to direct light that is reflected from the etalon 118 out of the optical path so that it may be detected. However, a 50/50 beam splitter 120, for example, may waste half of the incoming light from the telescope, and it may be beneficial to have an optical design where the beam splitter 120 is not utilized. In one example embodiment, light incident on the etalon can be directed at a slight angle with respect to normal, and the geometry of the various optical components may be arranged so that the light reflected from the etalon may be directed to the second detector 124 without the need for the beam splitter 120.

According to example embodiments, light transmitted through the etalon 118 may be designated as "T" for transmitted, and may be detected by the first detector 122. According to example embodiments, light reflected from the etalon 118 may be designated at "R" for reflected, and may be detected by the second detector 124. Signals from the detectors may be processed by the controller 130.

According to an example embodiment, the controller 130 may include a memory 132, one or more processors 134, and one or more input/output (I/O) interfaces 136. In an example embodiment, the controller may include a network interface 138 for communication with one or more networks 146. According to an example embodiment, a local workstation 148 may be in communication with the controller 130.

In an example embodiment, the controller memory 132 may include an operating system 140 and data 142. According to an example embodiment, the memory 132 may include one or more processing or control modules. For example, a laser and/or telescope control module 144 may be utilized for controlling the laser 102. In one example, the laser and/or telescope control module 144 may be used for tuning the laser. In another example, the laser and/or telescope control module 144 may be utilized for modifying parameters associated with the telescope module 104, such as beam size, direction, etc.

According to an example embodiment, the controller may include a LIDAR module 145, which may be utilized to process signals from the first detector 122 and the second detector 124. According to an example embodiment, the signals from the first detector 122 and the second detector 124 may be sampled and stored for processing. According to an example embodiment, the LIDAR module 145 may be utilized for normalizing the detected signals, for example, as previously indicated, and a derived signal T/(T+R) may be utilized to normalize the signals from the two detectors 122, 124.

Figure 2:
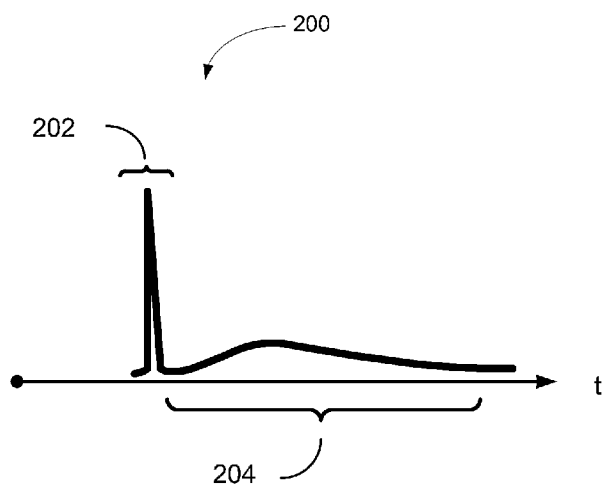
FIG. 2 depicts an example received time-domain signal from the LIDAR system, according to an example embodiment of the invention.

FIG. 2 depicts an example received time-domain signal 200 from the LIDAR system, according to an example embodiment of the invention. In an example embodiment, the time-domain signal 200 may include an initial peak 202, resulting primarily in output beam 108 scattering from optical components in the telescope module 104 or optionally an intentionally back reflected portion of the output beam 108 with one or more optical components. The initial peak 202 may have a width equal or greater than the corresponding output laser pulse width (for example, greater than about 10 ns). According to an example embodiment, the received time-domain signal 200 may also include a tail portion 204 that corresponds in time to a round trip distance of the subsequent atmospheric backscatter responses from the output light pulse. The example time-domain signal 200 shown in FIG. 2 may represent a detected signal with the laser (as in 102 of FIG. 1) tuned to either edge of the transmission peak of the etalon (as in 118 of FIG. 1). According to an example embodiment, two measurements (with the laser tuned to each edge of the etalon) may be performed to detect two received time-domain signals 200. According to an example embodiment, the two received time domain signals 200 may be compared to determine atmospheric wind speed. These two measurements will be further discussed below with reference to FIG. 3.

Figure 3:
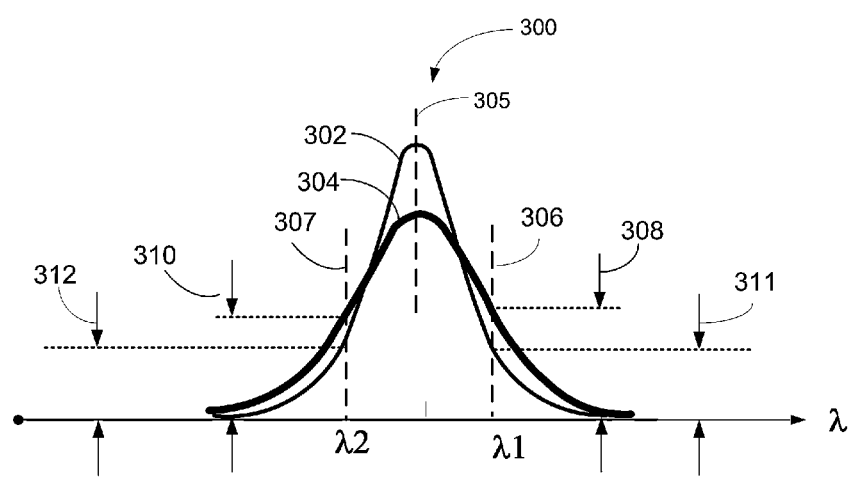
FIG. 3 illustrates a transmission spectra near a wavelength peak of an etalon, according to an example embodiment of the invention.

FIG. 3 illustrates a transmission spectra and a broadened response near a wavelength peak of an etalon, according to an example embodiment of the invention. For example, the etalon may have a transmission response 302 as a function of wavelength $\lambda$, as determined from the initial peak (for example, 202 in FIG. 2). A LIDAR signal response 304 corresponding to time delay in the tail part of the signal (204 in FIG. 2), continuous in wavelength, is also depicted to provide an example of how measurements from two wavelengths at either side of the etalon transmission peak may be utilized to determine wind speed. For example, the laser (as in 102 of FIG. 1) may be tuned to a first wavelength $\lambda_1$ corresponding approximately to the longer wavelength side point 306 associated with the etalon (as in 118 of FIG. 1), and a time-response measurement (as in 200 of FIG. 2) may be made. Next, the laser (as in 102 of FIG. 1) may be tuned to a second wavelength $\lambda_2$ corresponding approximately to the shorter wavelength side point 307 associated with the etalon (as in 118 of FIG. 1), and another time-response measurement (as in 200 of FIG. 2) may be made. The wavelengths 306 and 307 may further be selected in such a way that etalon transmission 311 and 312 are equal. In an example embodiment, the controller (130 of FIG. 1) may further control the wavelength of the laser (102 of FIG. 1) such that etalon transmission values 311 and 312 are equal to a certain predetermined value. In an example embodiment, etalon transmission values 311 and 312 may be evaluated in the time domain corresponding to the backscatter initial peak (as in 202 of FIG. 2). According to certain example embodiments, the initial peak (as in 202 of FIG. 2) may include significantly more optical power or intensity as compared to the tail portion (as in 204 of FIG. 2). According to example embodiments, a photomultiplier tube detector may be utilized for measuring the transmission response. In an example embodiment, the initial peak (as in 202 of FIG. 2) may saturate the detector and create difficulties for setting the transmission wavelengths 306, 307. According to an example embodiment, steps may be taken to insure that a linear response is detected with the detectors (for example 122, 124 of FIG. 1). In an example embodiment, a signal may be tapped from an intermediated dynode of a photomultiplier tube detector for determining the initial peak, and another signal may be taken from the anode of the photomultiplier tube for determining the tail portion.

According to an example embodiment, the LIDAR backscatter response at the first wavelength $\lambda_1$ 308 may vary from the response at the second wavelength $\lambda_2$ 310 due to Doppler shifts produced by atmospheric winds. According to an example embodiment, the variations between 308 and 310 may be used to determine the wind speed parallel to the laser beam. Such measurement may be repeated with the laser beam pointing in different directions in order to reconstruct the complete wind vector, as is conventionally done in the art.

Figure 4:
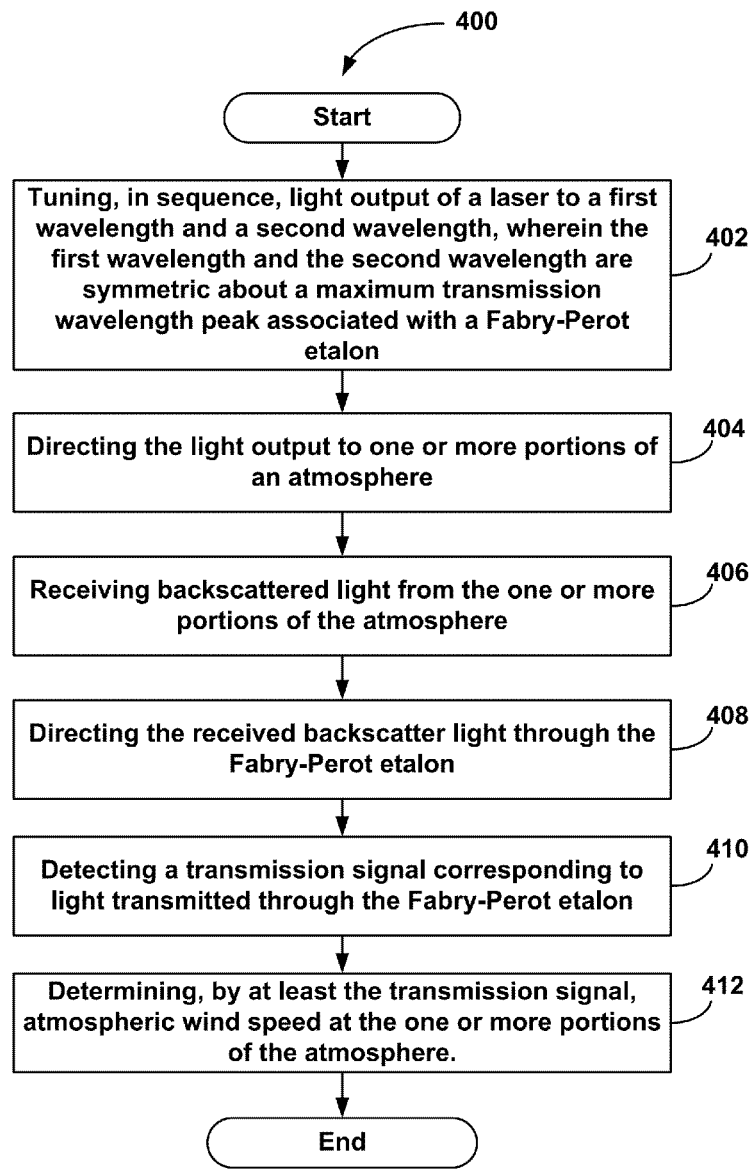
FIG. 4 is a flow diagram of an example method, according to an example embodiment of the invention.

FIG. 4 is a flow diagram of an example method 400 according to an example embodiment of the invention. In block 402, and according to an example embodiment, the method 400 can include tuning, in sequence, light output of a laser to a first wavelength and a second wavelength, wherein the first wavelength and the second wavelength are symmetric about a maximum transmission wavelength peak associated with a Fabry-Perot etalon. In block 404, the method 400 includes directing the light output to one or more portions of the atmosphere. In block 406, the method 400 includes receiving backscattered light from the one or more portions of the atmosphere. In block 408, the method 400 includes directing the received backscattered light through the Fabry-Perot etalon. In block 410, the method 400 includes detecting a transmission signal corresponding to light transmitted through the Fabry-Perot etalon. In block 412, the method 400 includes determining, by at least the transmission signal, atmospheric wind speed at one or more portions of the atmosphere. The method 400 ends after block 412.

Example embodiments can further include detecting a reflection signal corresponding to light reflected from the Fabry-Perot etalon 118; determining a normalized transmission signal by dividing the detected transmitted signal with the sum of the detected reflection signal and the detected transmission signal; and determining, by at least the normalized transmission signal, atmospheric wind speed at one or more portions of the atmosphere. According to an example embodiment, determining atmospheric wind speed further includes comparing a detected response of light at the first wavelength 306 with a detected response of light at the second wavelength 307.

In accordance with an example embodiment, the light output of the laser is pulsed, and atmospheric wind speed may be determined by detecting a transmission signal comprising a time-domain signal having temporal segments corresponding to a distance extending into the atmosphere, and wherein the time-domain signal comprises a peak region 202 and tail region 204. According to an example embodiment, atmospheric wind speed at one or more distances is determined by comparing two first detected transmission signals, corresponding to detected responses of light at the first wavelength 306 in the peak region 202 and the tail region 204, with two second detected transmission signals, corresponding to detected responses of light at the second wavelength 307 in the peak region 202 and the tail region 204, for one or more temporal segments. According to an example embodiment, backscattered light 110 can include laser light output 108 that is backscattered from one or more of the molecules or particles in the atmosphere.

Example embodiments may include a system and/or an apparatus. In an example embodiment, the system may include a telescope module 104, operable for directing the laser light output 108 to one or more portions of the atmosphere, and for receiving backscattered 110 from the one or more portions of atmosphere. According to an example embodiment, the system and/or apparatus includes an etalon 118; a tunable laser 102, operable for outputting, in sequence, laser light 108 at a first wavelength 306 and a second wavelength 307, wherein the first wavelength 306 and the second wavelength 307 are symmetric about a maximum transmission wavelength peak 305 associated with the etalon 118; at least a first detector 122 for detecting a transmission signal corresponding to light transmitted through the Fabry-Perot etalon 118; and a controller 130 including at least one processor 134 configured for determining, by at least the detected transmission signal, atmospheric wind speed at one or more portions of the atmosphere.

According to an example embodiment, the tunable laser is operable for pulsing. In an example embodiment, the system or apparatus may include at least a second detector 124 for detecting a reflection signal corresponding to light reflected from the Fabry-Perot etalon 118. In an example embodiment, the at least one processor 134 is further configured for determining a normalized transmission signal by dividing the detected transmitted signal with sum of the detected reflection signal and the detected transmission signal, and further configured for determining, by at least the normalized transmission signal, atmospheric wind speed at one or more portions of the atmosphere. In an example embodiment, the at least one processor 134 is further configured for determining atmospheric wind speed by comparing a detected response of light at the first wavelength 306 with a detected response of light at the second wavelength 307.

In an example embodiment, the at least first detector 122 is operable for detecting a transmission signal comprising a time-domain signal having temporal segments corresponding to a distance extending into the atmosphere, and wherein the time-domain signal comprises a peak region 202 and a tail region 204. In an example embodiment, atmospheric wind speed is determined by comparing two first detected transmission signals, corresponding to detected responses of light at the first wavelength 306 in the peak region 202 and the tail region 204, with two second detected transmission signal corresponding to detected responses of light at the second wavelength 307 in the peak region 202 and the tail region 204, for one or more temporal segments to determine atmospheric wind speed corresponding with one or more distances in the atmosphere, wherein the backscattered light 110 comprises laser light output 108 that is backscattered from one or more of the molecules or particles in the atmosphere.

According to example embodiments, certain technical effects can be provided, such as creating certain systems, methods, and apparatus that measure atmospheric wind speed.

In example embodiments of the invention, the Doppler LIDAR system 100 may include any number of hardware and/or software applications that are executed to facilitate any of the operations.

In example embodiments, one or more I/O interfaces may facilitate communication between the Doppler LIDAR system 100 and one or more input/output devices. For example, a universal serial bus port, a serial port, a disk drive, a CD-ROM drive, and/or one or more user interface devices, such as a display, keyboard, keypad, mouse, control panel, touch screen display, microphone, etc., may facilitate user interaction with the Doppler LIDAR system 100. The one or more I/O interfaces may be utilized to receive or collect data and/or user instructions from a wide variety of input devices. Received data may be processed by one or more computer processors as desired in various embodiments of the invention and/or stored in one or more memory devices.

One or more network interfaces may facilitate connection of the Doppler LIDAR system 100 inputs and outputs to one or more suitable networks and/or connections; for example, the connections that facilitate communication with any number of sensors associated with the system. The one or more network interfaces may further facilitate connection to one or more suitable networks; for example, a local area network, a wide area network, the Internet, a cellular network, a radio frequency network, a Bluetooth™ (owned by Telefonaktiebolaget LM Ericsson) enabled network, a Wi-Fi™ (owned by Wi-Fi Alliance) enabled network, a satellite-based network, any wired network, any wireless network, etc., for communication with external devices and/or systems.

As desired, embodiments of the invention may include the Doppler LIDAR system 100 with more or less of the components illustrated in FIG. 1.

Certain embodiments of the invention are described above with reference to block and flow diagrams of systems, methods, apparatuses, and/or computer program products according to example embodiments of the invention. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some embodiments of the invention.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, embodiments of the invention may provide for a computer program product, comprising a computer-usable medium having a computer-readable program code or program instructions embodied therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

While certain embodiments of the invention have been described in connection with what is presently considered to be the most practical and various embodiments, it is to be understood that the invention is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain embodiments of the invention, including the best mode, and also to enable any person skilled in the art to practice certain embodiments of the invention, including making and using any devices or systems and performing any incorporated methods. The patentable scope of certain embodiments of the invention is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The claimed invention is:

1. A method, comprising executing computer executable instructions by one or more processors for measuring atmospheric wind speed, the method further comprising:

tuning, in sequence, light output of a laser to a first wavelength and a second wavelength, wherein the first wavelength and the second wavelength are symmetric about a maximum transmission wavelength peak associated with a Fabry-Perot etalon;

directing the light output to one or more portions of an atmosphere;

receiving backscattered light from the one or more portions of the atmosphere;

directing the received backscatter light through the Fabry-Perot etalon;

detecting a transmission signal corresponding to light transmitted through the Fabry-Perot etalon;

determining, by the one or more processors and at least the transmission signal, atmospheric wind speed at the one or more portions of the atmosphere;

detecting a reflection signal corresponding to light reflected from the Fabry-Perot etalon;

determining a normalized transmission signal by dividing the detected transmitted signal with a sum of the detected reflection signal and the detected transmission signal; and determining, by at least the normalized transmission signal, atmospheric wind speed at the one or more portions of the atmosphere.

2. The method of claim 1, wherein determining atmospheric wind speed further comprises comparing a detected response of backscattered light at the first wavelength with a detected response of backscattered light at the second wavelength.

3. The method of claim 1, wherein the light output of the laser is pulsed, and wherein determining atmospheric wind speed comprises detecting a signal comprising a time-domain signal having temporal segments corresponding to a distance extending into the atmosphere, and wherein the time-domain signal comprises a peak region and a tail region.

4. The method of claim 3, wherein atmospheric wind speed at one or more distances is determined by comparing a detected response of light at the first wavelength in the tail region, with a detected response of light at the second wavelength in the tail region for one or more temporal segments.

5. The method of claim 1, wherein the backscattered light comprises light output that is backscattered from one or more of molecules or particles in the atmosphere.

6. A system comprising:

a Fabry-Perot etalon;

a tunable laser, operable for outputting, in sequence, light at a first wavelength and a second wavelength, wherein the first wavelength and the second wavelength are symmetric about a maximum transmission wavelength peak associated with the Fabry-Perot etalon;

a telescope module, operable for directing the laser light output to one or more portions of an atmosphere, and for receiving backscattered light from the one or more portions of the atmosphere;

at least a first detector for detecting a transmission signal corresponding to light transmitted through the Fabry-Perot etalon;

a controller comprising at least one processor configured for determining, by at least a detected transmission signal, atmospheric wind speed at the one or more portions of the atmosphere; and at least a second detector for detecting a reflection signal corresponding to light reflected from the Fabry-Perot etalon, wherein:

the at least one processor is further configured for determining a normalized transmission signal by dividing the detected transmitted signal with a sum of the detected reflection signal and the detected transmission signal, and further configured for determining, by at least the normalized transmission signal, atmospheric wind speed at one or more portions of the atmosphere.

7. The system of claim 6, wherein the tunable laser is operable for pulsing.

8. The system of claim 6, wherein the at least one processor is further configured for determining atmospheric wind speed by comparing a detected response of light at the first wavelength with a detected response of light at the second wavelength.

9. The system of claim 6, wherein the at least first detector is operable for detecting a transmission signal comprising a time-domain signal having temporal segments corresponding to a distance extending into the atmosphere, and wherein the time-domain signal comprises a peak region and a tail region.

10. The system of claim 9, wherein atmospheric wind speed is determined by comparing a detected response of light at the first wavelength in the tail region, with a detected response of light at the second wavelength in the tail region for one or more temporal segments.

11. The system of claim 6, wherein the backscattered light comprises light output that is backscattered from one or more of molecules or particles in the atmosphere.

12. An apparatus comprising:

a Fabry-Perot etalon;

a tunable laser, operable for outputting, in sequence, light at a first wavelength and a second wavelength, wherein the first wavelength and the second wavelength are symmetric about a maximum transmission wavelength peak associated with the Fabry-Perot etalon;

at least a first detector for detecting a transmission signal corresponding to light transmitted through the Fabry-Perot etalon;

a controller comprising at least one processor configured for determining, by at least a detected transmission signal, atmospheric wind speed one or more portions of an atmosphere; and at least a second detector for detecting a reflection signal corresponding to light reflected from the Fabry-Perot etalon, wherein:

the at least one processor is further configured for determining a normalized transmission signal by dividing the detected transmitted signal with sum of the detected reflection signal and the detected transmission signal, and further configured for determining, by at least the normalized transmission signal, atmospheric wind speed at the one or more portions of the atmosphere.

13. The apparatus of claim 12, wherein the tunable laser comprises a q-switched laser operable for pulsing.

14. The apparatus of claim 12, wherein the at least one processor is further configured for determining atmospheric wind speed by comparing a detected response of light at the first wavelength with a detected response of light at the second wavelength.

15. The apparatus of claim 12, wherein the at least first detector is operable for detecting a transmission signal comprising a time-domain signal having temporal segments corresponding to a distance extending into the atmosphere, and wherein the time-domain signal comprises a peak region and a tail region.

16. The apparatus of claim 15, wherein atmospheric wind speed is determined by comparing a detected response of light at the first wavelength in the tail region, with a detected response of light at the second wavelength in the tail region for one or more temporal segments.

17. The apparatus of claim 12, wherein the backscattered light comprises light output that is backscattered from the one or more of molecules or particles in the atmosphere.

\* \* \* \* \*